US007827886B2

(12) United States Patent
Hu

(10) Patent No.: US 7,827,886 B2
(45) Date of Patent: Nov. 9, 2010

(54) RATCHET WRENCH WITH THREE OPERATIVE POSITIONS

(76) Inventor: Bobby Hu, No. 22, Lane 52, Sec. 3, Hu-Lai Road, Hsi-Tun Dist., Taichung (TW)

( * ) Notice: Subject to any disclaimer, the term of this patent is extended or adjusted under 35 U.S.C. 154(b) by 245 days.

(21) Appl. No.: 12/273,592

(22) Filed: Nov. 19, 2008

(65) Prior Publication Data

US 2010/0037735 A1 Feb. 18, 2010

(30) Foreign Application Priority Data

Aug. 18, 2008 (TW) ............................. 97131409 A

(51) Int. Cl.
*B25B 13/46* (2006.01)

(52) U.S. Cl. ....................................... 81/63.1; 192/43.2

(58) Field of Classification Search ..................... 81/62, 81/63, 63.1, 63.2; 192/43.1, 43.2
See application file for complete search history.

(56) References Cited

U.S. PATENT DOCUMENTS

| | | | | |
|---|---|---|---|---|
| 4,445,404 | A | 5/1984 | Parker | 81/62 |
| 4,491,043 | A | 1/1985 | Dempsey et al. | 81/58 |
| 4,589,307 | A | 5/1986 | Parker | 81/62 |
| 6,076,433 | A | 6/2000 | Lynch | 81/63 |
| 6,125,722 | A | 10/2000 | Hopper et al. | 81/63 |
| 6,431,031 | B1 * | 8/2002 | Hu | 81/63.2 |
| 6,457,387 | B1 * | 10/2002 | Hu | 81/63.2 |
| 6,955,104 | B2 * | 10/2005 | Hu | 81/63.2 |
| 6,964,216 | B2 * | 11/2005 | Chen | 81/63.1 |
| 6,971,285 | B2 * | 12/2005 | Chen | 81/63.1 |
| 6,981,434 | B2 * | 1/2006 | Chen | 81/63.1 |
| 7,082,859 | B2 * | 8/2006 | Huang | 81/62 |
| 7,111,527 | B1 | 9/2006 | Lee | 81/63.1 |
| 7,328,633 | B2 * | 2/2008 | Lin | 81/63.1 |

FOREIGN PATENT DOCUMENTS

| | | |
|---|---|---|
| TW | 235541 | 12/1994 |
| TW | 373543 | 11/1999 |
| TW | 399509 | 7/2000 |
| TW | 524174 | 3/2003 |
| TW | 589241 | 6/2004 |

* cited by examiner

*Primary Examiner*—D. S Meislin
(74) *Attorney, Agent, or Firm*—Alan Kamrath; Kamrath & Associates PA

(57) ABSTRACT

A ratchet wrench includes a drive member rotatably received in a body that includes a compartment extending from a first side toward and spaced from a second side of the body. A control member is pivotable between three operative positions to change the driving direction of the ratchet wrench. The control member includes a first end pivotably coupled to the drive member and a second end covering the compartment. The control member includes a control section selectively engaged with two pawls slideably received in the compartment and releasably engaged with teeth of the drive member. When the control member is in a second operative position, the pawls are engaged with the teeth of the drive member, allowing a handle of the body and the drive member to rotate in either of two directions driving the fastener, and not allowing free rotation of the handle relative to the drive member in either of the two directions without driving the fastener.

9 Claims, 9 Drawing Sheets

RATCHET WRENCH WITH THREE OPERATIVE POSITIONS

BACKGROUND OF THE INVENTION

1. Field of the Invention

The present invention relates to a ratchet wrench and, more particularly, to a ratchet wrench with a switch for changing a driving direction thereof.

2. The Prior Arts

Taiwan Patent Publication No. 373543 entitled "RATCHET WRENCH STRUCTURE WITH ANGLE-CHANGEABLE SINGLE DIRECTION COUPLING" discloses a ratchet wrench including a body having a head and a handle interconnected to the head at an angle of 15°. The head includes a compartment receiving a gear wheel and a pawl. A retaining ring includes a tang fixed in a hole of the pawl. The retaining ring further includes two engaging grooves opposite to the tang. A switch has a portion pivotably mounted in an end of the compartment and pivotable between two operative positions. A peg mounted in the body is selectively engaged with one of the engaging grooves to retain the retaining ring in place. Pivotal movement of the switch causes sliding movement of the pawl via the retaining ring to change the driving direction of the ratchet wrench. However, the retaining ring made of a wire is liable to deform after a period of time, such that the pawl can not be moved to the desired position, leading to adverse affect to the function of the ratchet wrench. Furthermore, a peg is required in the body to retain the retaining ring in place. The overall structure is complicated and requires troublesome and time-consuming assembly, resulting in an increase in the manufacturing costs. Furthermore, although such a ratchet wrench can drive fasteners such as bolts, nuts, etc. in either of clockwise and counterclockwise directions while allowing free rotation in a reverse direction, the ratchet wrench can not be utilized as a conventional wrench of the type capable of driving fasteners in either direction and not allowing free rotation in the reverse direction, which may be required in some cases. As an example, when it is desired to proceed with slight tightness adjustment of a fastener by rotating the fastener in the tightening direction and/or loosening direction before the desired tightness is obtained, a user has to frequently move the switch between two operative positions to change the driving direction of the ratchet wrench, which is time-consuming and laborsome.

Thus, a need exists for a ratchet wrench with a simplified structure while allowing reliable operation as well as slight tightness adjustment.

SUMMARY OF THE INVENTION

The present invention solves this need and other problems in the field of reliable operation of wrenches by providing, in a preferred form, a ratchet wrench including a body having a driving portion and a handle interconnected to the driving portion. The driving portion includes opposite first and second sides. The driving portion includes a first compartment. The driving portion further includes a second compartment in communication with the first compartment. The second compartment extends from the first side toward and spaced from the second side. A drive member is rotatably received in the first compartment and includes a plurality of teeth in an outer periphery thereof. The drive member includes an end extending beyond the first side of the driving portion. First and second pawls are slideably received in the second compartment. Each of the first and second pawls includes an inner face facing the teeth of the drive member. The inner face of each of the first and second pawls includes a plurality of teeth releasably engaged with the teeth of the drive member. An elastic element is mounted between the first and second pawls to bias the first and second pawls away from each other to engage the teeth of the first and second pawls with the teeth of the drive member. Each of the first and second pawls further includes a top face transverse to the inner face. The first pawl further includes a first coupling portion on the top face thereof. The second pawl further includes a second coupling portion on the top face thereof. A control member includes first and second ends and first and second faces extending between the first and second ends. The first end of the control member is pivotably mounted to the end of the drive member. The second end of the control member covers the second compartment. The control member further includes a control section on the second face thereof. The control member is pivotable between first, second, and third operative positions, with the second operative position intermediate the first and third operative positions.

When the control member is in the first operative position, the teeth of the second pawl are engaged with the teeth of the drive member, the control section of the control member is engaged with the first coupling portion of the first pawl to disengage the teeth of the first pawl from the teeth of the drive member, allowing the handle and the drive member to rotate in a first direction driving a fastener in the first direction, and allowing the handle to rotate freely relative to the drive member in a second direction reverse to the first direction without driving the fastener.

When the control member is in the third operative position, the teeth of the first pawl are engaged with the teeth of the drive member, the control section of the control member is engaged with the second coupling portion of the second pawl to disengage the teeth of the second pawl from the teeth of the drive member, allowing the handle and the drive member to rotate in the second direction driving the fastener in the second direction, and allowing the handle to rotate freely relative to the drive member in the first direction without driving the fastener.

When the control member is in the second operative position, the teeth of each of the first and second pawls are engaged with the teeth of the drive member, allowing the handle and the drive member to rotate in either of the first and second directions driving the fastener, and not allowing free rotation of the handle relative to the drive member in either of the first and second directions without driving the fastener.

In the most preferred form, the first side of the driving portion includes a hole. The second face of the control member further includes an engaging groove with two sidewalls each having a notch. A retaining member in the form of a pin includes a first end fixed in the hole and a second end received in engaging groove. A positioning member in the form of a strip includes two ends fixed in the engaging groove. The strip further includes first, second, and third positioning grooves corresponding to the first, second, and third operative positions of the control member. The second end of the retaining member is selectively engaged in one of the first, second, and third positioning grooves to retain the control member in one of the first, second, and third operative positions.

The present invention will become clearer in light of the following detailed description of illustrative embodiments of this invention described in connection with the drawings.

BRIEF DESCRIPTION OF THE DRAWINGS

The illustrative embodiments may best be described by reference to the accompanying drawings where.

Figure 1:
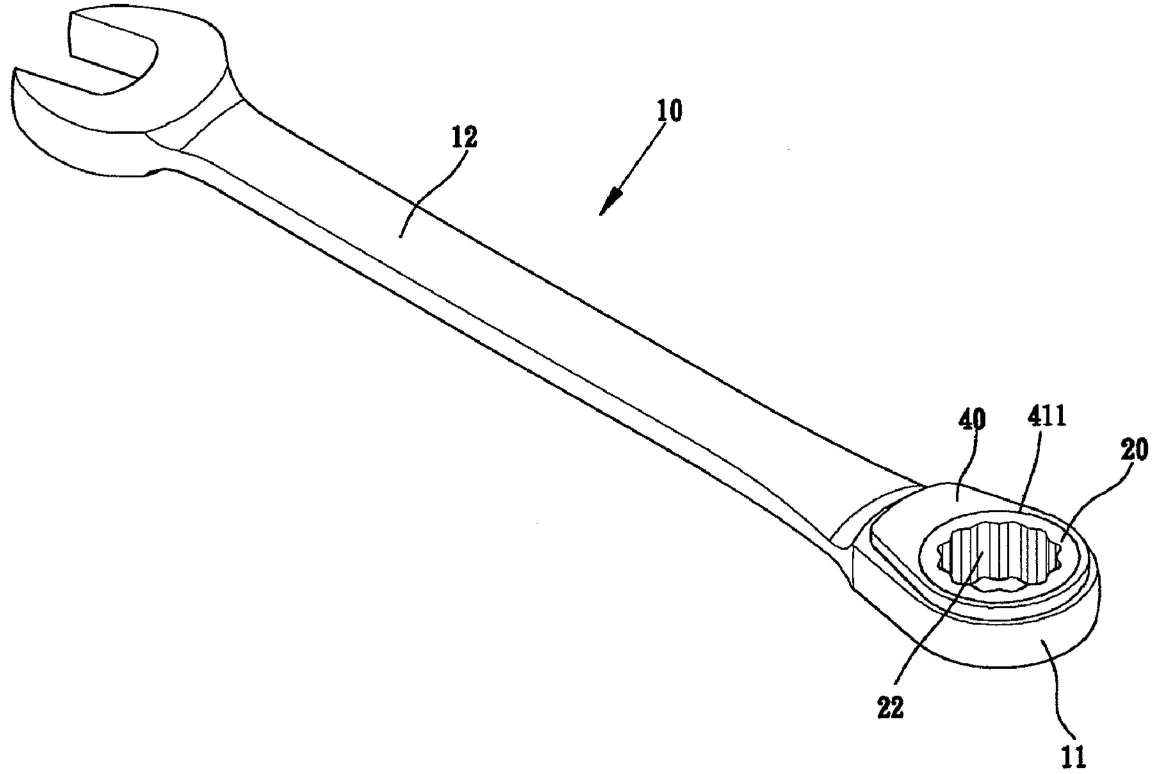
FIG. 1 shows a perspective view of a ratchet wrench according to the preferred teachings of the present invention.
Figure 2:
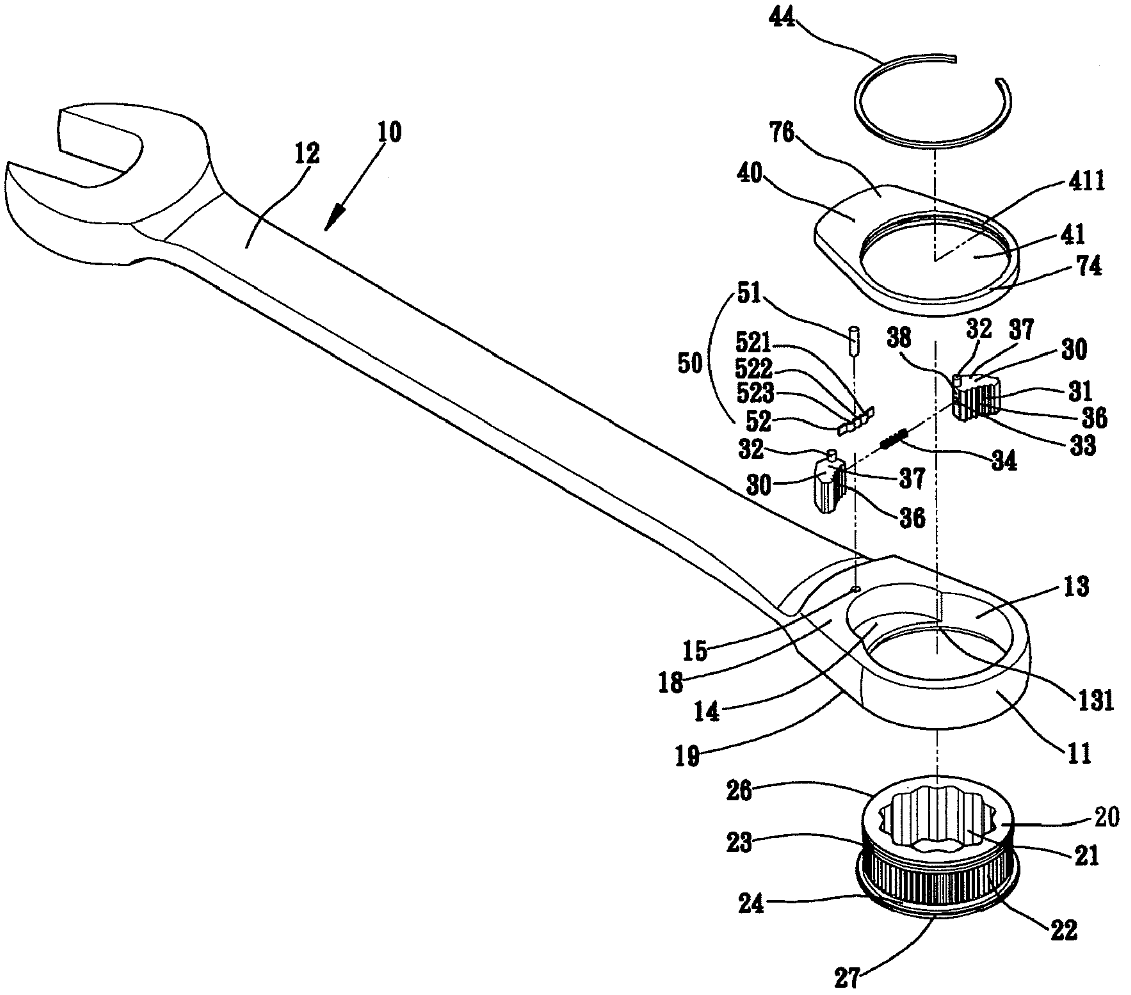
FIG. 2 shows an exploded, perspective view of the ratchet wrench of FIG. 1.
Figure 3:
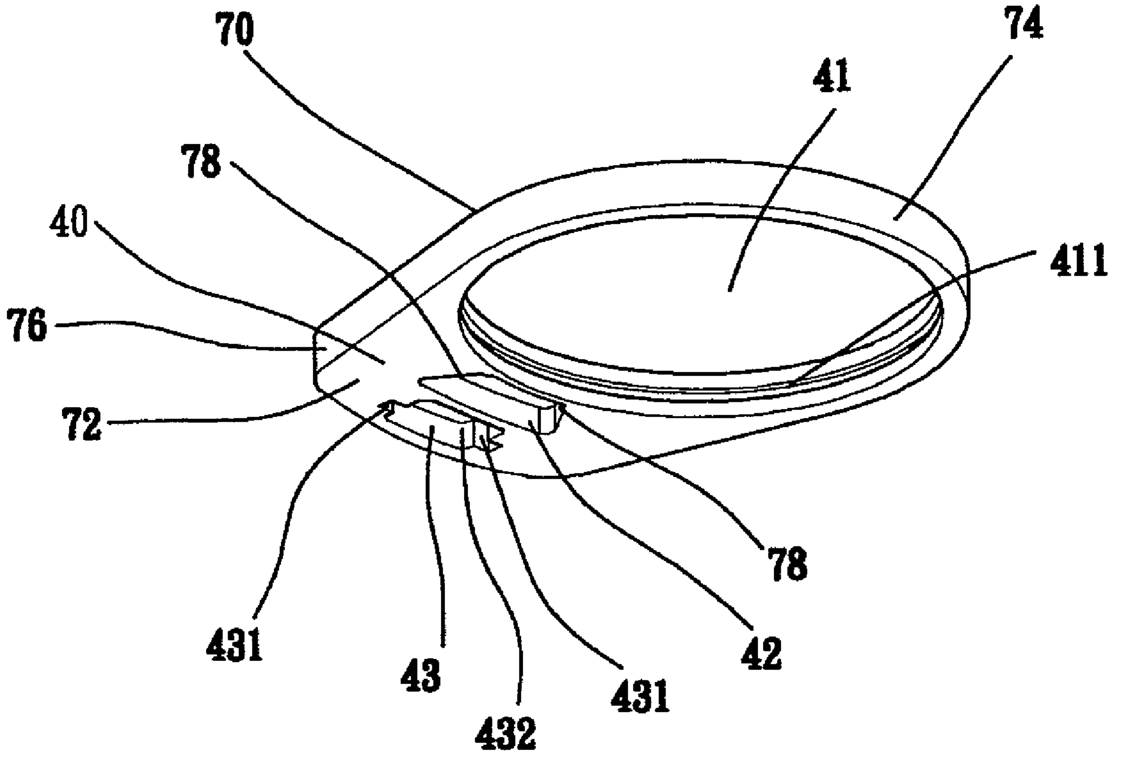
FIG. 3 shows a bottom, perspective view of a control member of the ratchet wrench of FIG. 1.
Figure 4:
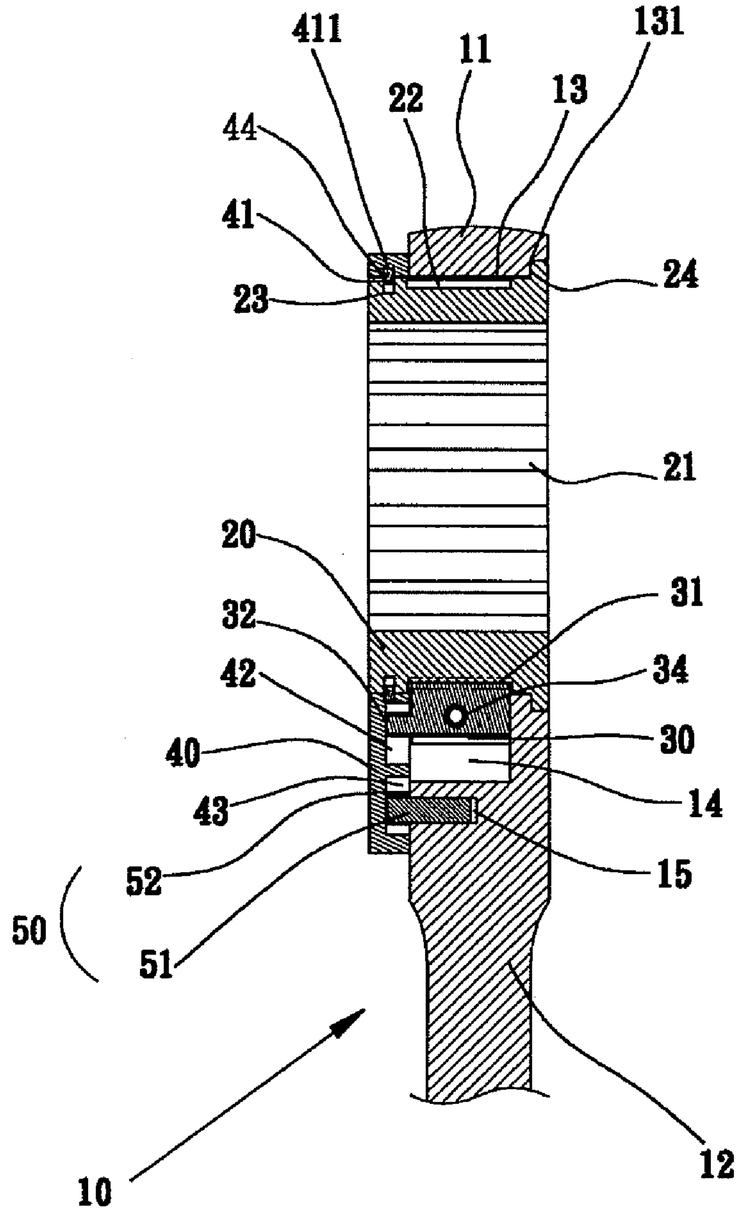
FIG. 4 shows a partial, cross sectional view of the ratchet wrench of FIG. 1.

All figures are drawn for ease of explanation of the basic teachings of the present invention only; the extensions of the figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "third", "inner", "outer", "top", "side", "end", "portion", "section", "lateral", "annular", "clockwise", "counterclockwise", and similar terms are used herein, it should be understood that these terms have reference only to the structure shown in the drawings as it would appear to a person viewing the drawings and are utilized only to facilitate describing the invention.

DETAILED DESCRIPTION OF THE PREFERRED EMBODIMENTS

A ratchet wrench according to the preferred teachings of the present invention is shown in the drawings and generally includes a body 10 having a driving portion 11 and a handle 12 interconnected to driving portion 11. Driving portion 11 includes opposite first and second sides 18 and 19 and a first compartment 13 in the most preferred form shown as a through-hole extending from first side 18 through second side 19. An annular groove or recess 131 is defined in an end of a peripheral wall of first compartment 13. Furthermore, annular recess 131 is formed in second side 19. According to the most preferred form shown, a second compartment 14 extends from first side 18 toward and spaced from second side 19. Specifically, second compartment 14 is in communication with first compartment 13 and includes a bottom wall intermediate first and second sides 18 and 19. A hole 15 is formed in first side 18 adjacent second compartment 14.

According to the preferred form shown, a drive member 20 is rotatably received in first compartment 13. Drive member 20 includes a driving section 21 in a central portion thereof for directly or indirectly engaging with a fastener to be loosened or tightened. According to the most preferred form shown, driving section 21 includes a through-hole having a polygonal inner periphery for engaging and driving a fastener. Other forms of driving section 21 would be within the skill of the art. An annular groove 23 is formed in a first end 26 of the outer periphery of drive member 20. First end 26 of drive member 20 extends beyond first side 18 of driving portion 11. A flange 24 is formed on a second end 27 of the outer periphery of drive member 20. Flange 24 is rotatably received in annular recess 131 of driving portion 11. Drive member 20 further includes a plurality of teeth 22 in the outer periphery thereof between first and second ends 26 and 27.

According to the preferred form shown, first and second pawls 30 are slideably received in two ends of second compartment 14. Each of first and second pawls 30 includes an inner face 36 facing teeth 22 of drive member 20. Inner face 36 of each of first and second pawls 30 includes a plurality of teeth 31 releasably engaged with teeth 22 of drive member 20. Each of first and second pawls 30 further includes a top face 37 transverse to inner face 36. According to the most preferred form shown, a coupling portion 32 in the preferred form shown as a peg is formed on an inner end of top face 37 of each of first and second pawls 30. Each of first and second pawls 30 further includes an end face 38 transverse to top face 37 and to inner face 36. End faces 38 face each other and each has a receptacle 33. An elastic element 34 in the most preferred form shown as a spring is attached between first and second pawls 30 and includes two ends received in receptacles 33. Elastic element 34 biases first and second pawls 30 away from each other to engage teeth 31 of first and second pawls 30 with teeth 22 of drive member 20.

According to the preferred form shown, a control member 40 is coupled to drive member 20 and includes first and second ends 74 and 76. Specifically, first end 74 includes a hole 41 rotatably receiving first end 26 of drive member 20. An annular groove 411 is defined in a peripheral wall of hole 41. A retainer ring 44 in the most preferred form shown as a C-clip is partially received in annular groove 23 of drive member 20 and partially received in annular groove 411 of first end 74 of control member 40, allowing rotation of drive member 20 relative to body 10 while retaining drive member 20 in first compartment 13. Furthermore, control member 40 is pivotable relative to drive member 20 between first, second, and third operative positions. Second end 76 of control member 40 covers second compartment 14. Control member 40 further includes first and second faces 70 and 72 extending first and second ends 74 and 76. According to the most preferred form shown, hole 41 extends from first face 70 through second face 72. A control section 42 in the most preferred form shown as a trapezoidal groove is formed in second side 72. The trapezoidal groove includes first and second lateral walls 78 and has decreasing widths toward first end 74. Control member 40 further includes an engaging groove 43 in second face 72. Engaging groove 43 includes two sidewalls 432 each having a notch 431.

According to the preferred form shown, a positioning device 50 is provided to retain control member 40 in one of the first, second, and third operative positions. Positioning device 50 includes a retaining member 51 in the most preferred form shown as a pin having a first end fixed in hole 15 and a second end received in engaging groove 43. Positioning device 50 further includes a positioning member 52 in the most preferred form shown as a strip having two ends engaged in notches 432 and first, second, and third positioning grooves 521, 522, and 523 in a side of the strip. The second end of retaining member 51 is selectively engaged in one of first, second, and third positioning grooves 521, 522, and 523 to retain control member 40 in one of the first, second, and third operative positions.

Figure 5:
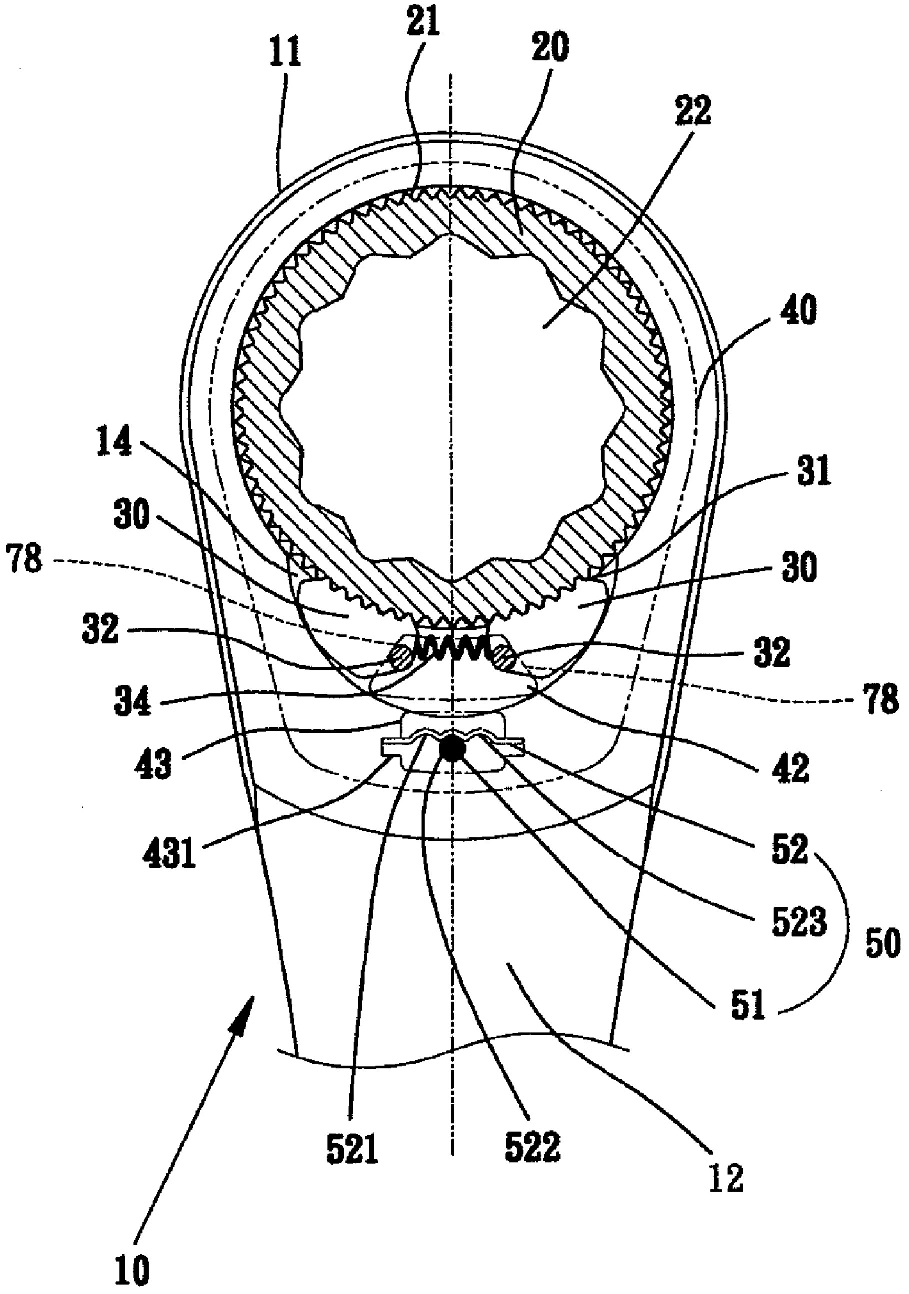
FIG. 5 shows a partial, cross sectional view of the ratchet wrench of FIG. 1 with the control member in a second operative position.

Now that the basic construction of the ratchet wrench of the preferred teachings of the present invention has been explained, the operation and some of the advantages of the ratchet wrench can be set forth and appreciated. In particular, for the sake of explanation, it will be assumed that control member 40 is initially in the second operative position (FIG. 5) intermediate the first and third operative positions. Retaining member 51 is received in second positioning groove 522. Coupling portions 32 of first and second pawls 30 are located between first and second lateral walls 78 of control section 42. Furthermore, teeth 31 of each of first and second pawls 30 are engaged with teeth 22 of drive member 20, allowing handle 12 and drive member 20 to rotate in either of clockwise and counterclockwise directions to drive a fastener in the same direction. Free rotation of handle 12 relative to drive member 20 in either direction without driving the fastener is not allowed.

Figure 6:
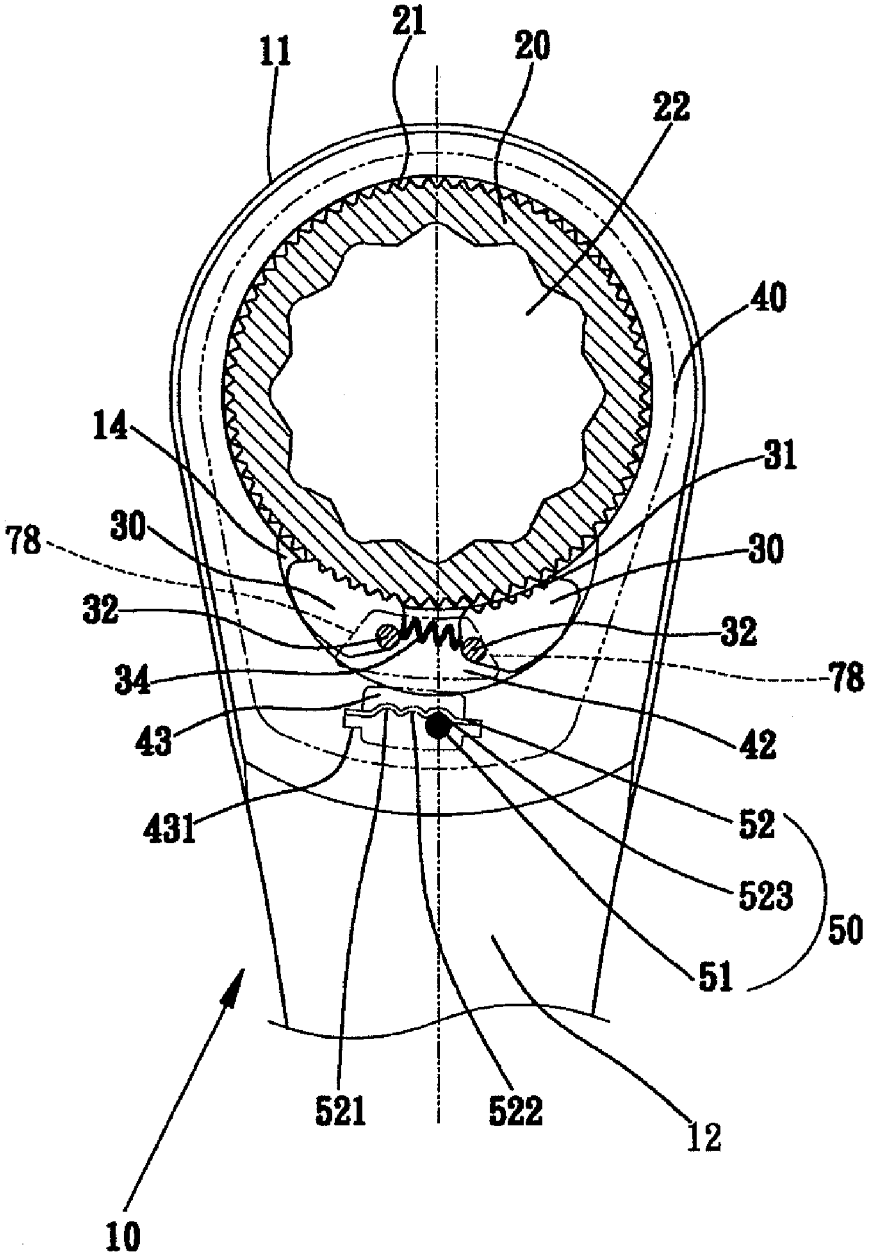
FIG. 6 shows a partial, cross sectional view similar to FIG. 5 with the control member in a third operative position.

When the control member 40 is moved from the second operative position to the third operative position (FIG. 6), second lateral wall 78 of control section 42 engages with and moves coupling portion 32 of second pawl 30. Thus, second pawl 30 is moved away from drive member 20. As a result, teeth 31 of second pawl 30 are disengaged from teeth 22 of drive member 20. Teeth 31 of first pawl 30 are still engaged with teeth 22 of drive member 20, for first lateral wall 78 moves away form coupling portion 32 of first pawl 30 in a direction without actuating coupling portion 32 of first pawl 30. Retaining member 51 is received in third positioning groove 523 of control member 40. In this state, handle 12 and drive member 20 can rotate in the counterclockwise direction to drive the fastener in the counterclockwise direction. Furthermore, handle 12 can rotate freely relative to drive member 20 in the clockwise direction without driving the fastener.

Figure 7:
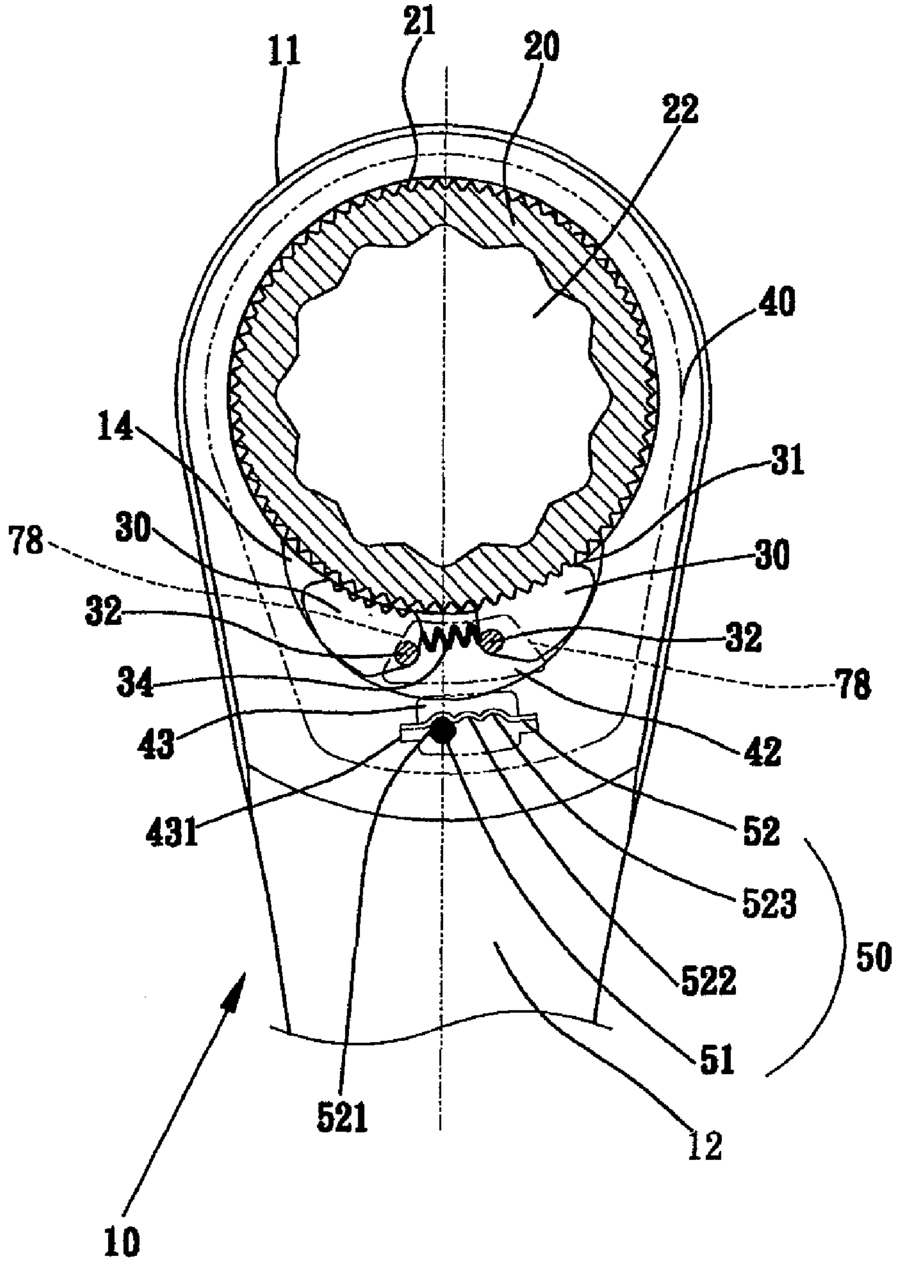
FIG. 7 shows a partial, cross sectional view similar to FIG. 5 with the control member in a first operative position.

When the control member 40 is pivoted from the second operative position to the first operative position (FIG. 7), first lateral wall 78 of control section 42 engages with and moves coupling portion 32 of first pawl 30. Thus, first pawl 30 is moved away from drive member 20. As a result, teeth 31 of first pawl 30 are disengaged from teeth 22 of drive member 20. Teeth 31 of second pawl 30 are still engaged with teeth 22 of drive member 20, for second lateral wall 78 moves away from coupling portion 32 of second pawl 30 in a direction without actuating coupling portion 32 of second pawl 30. Retaining member 51 is received in first positioning groove 521. In this state, handle 12 and drive member 20 can rotate in the clockwise direction to drive the fastener in the clockwise direction. Furthermore, handle 12 can rotate freely relative to drive member 20 in the counterclockwise direction without driving the fastener.

Furthermore, switching of control member 40 between the first, second, and third operative positions can be rapidly achieved through small angular travel of control member 40. Further, the ratchet wrench according to the preferred teachings of the present invention can be utilized to perform slight tightness adjustment of the fastener when control member 40 is in the second operative position.

Figure 8:
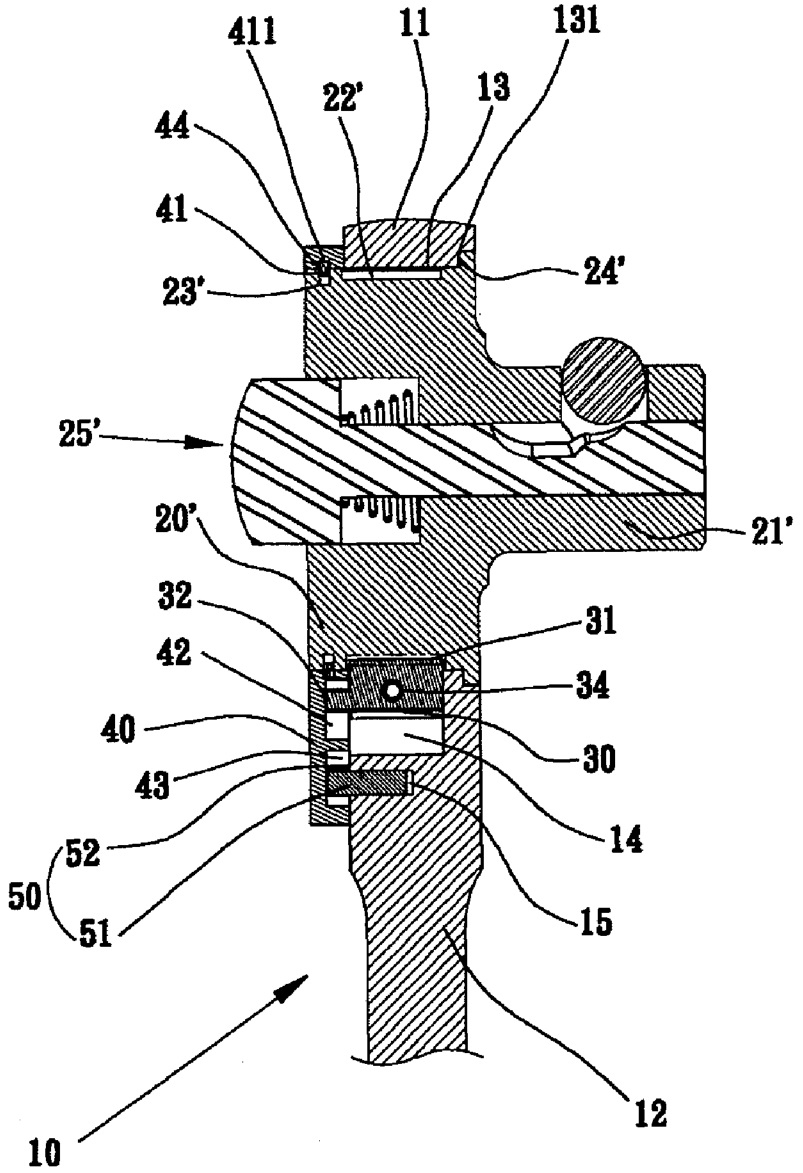
FIG. 8 shows a partial, cross sectional view of a ratchet wrench of a modified embodiment according to the preferred teachings of the present invention.
Figure 9:
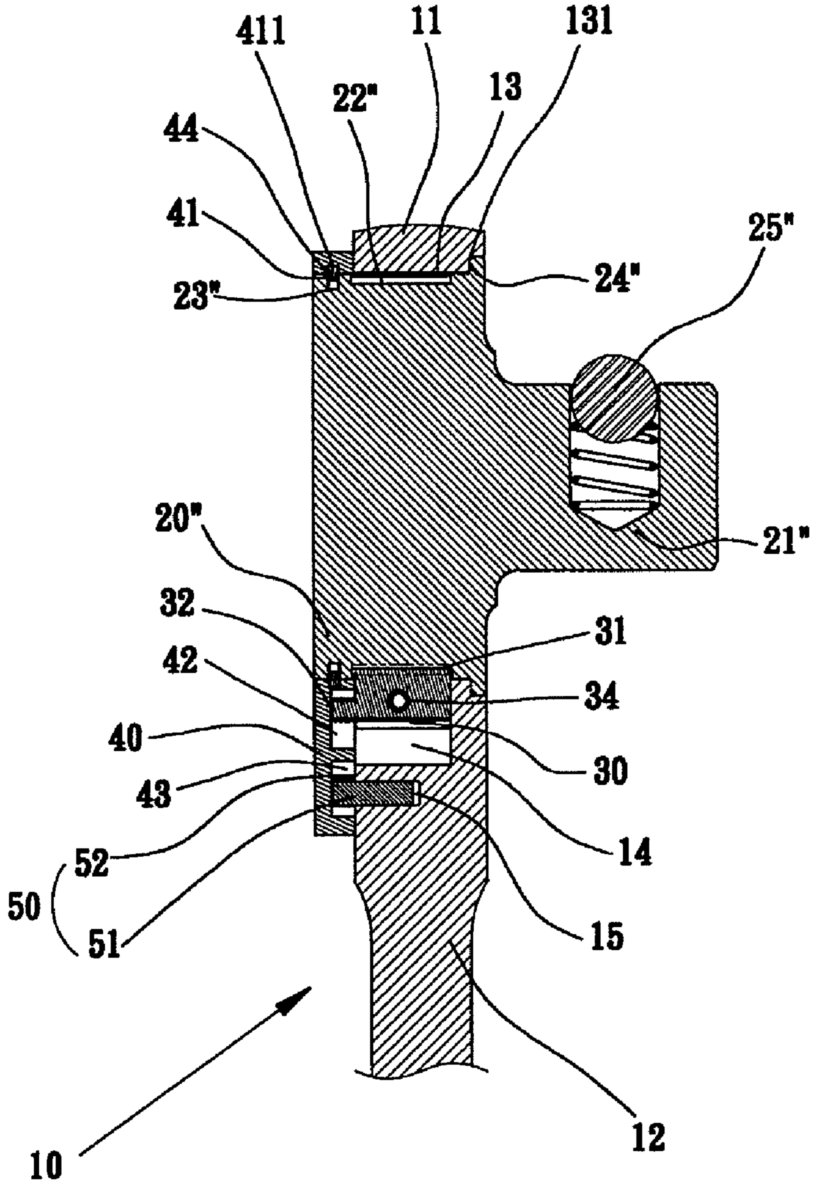
FIG. 9 shows a partial, cross sectional view of a ratchet wrench of another modified embodiment according to the preferred teachings of the present invention.

Now that the basic teachings of the present invention have been explained, many extensions and variations will be obvious to one having ordinary skill in the art. Drive member 20 can be of other forms. In a modified example shown in FIG. 8, drive member 20' also includes a plurality of teeth 22', an annular groove 23', and a flange 24' on an outer periphery thereof. Furthermore, drive member 20' includes a drive section 21' outside of driving portion 11 of body 10. Drive section 21' is in the form of a drive column having square cross sections. Drive section 21' includes a spring-biased coupler 25' for releasable coupling with a socket. In another modified example shown in FIG. 9, drive member 20" also includes a plurality of teeth 22", an annular groove 23", and a flange 24" on an outer periphery thereof. Furthermore, drive member 20" includes a drive section 21" outside of driving portion 11 of body 10. Drive section 21" is in the form of a drive column having square cross sections. Drive section 21" includes a spring-biased quick-release coupler 25" allowing releasable coupling with a socket. Other forms of drive member 20, 20', 20" would be within the skill of the art.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A ratchet wrench, in combination:

a body including a driving portion and a handle interconnected to the driving portion, with the driving portion including opposite first and second sides, with the driving portion including a first compartment, with the driving portion further including a second compartment in communication with the first compartment, with the second compartment extending from the first side toward and spaced from the second side;

a drive member rotatably received in the first compartment, with the drive member including a plurality of teeth in an outer periphery thereof, with the drive member including a first end extending beyond the first side of the driving portion;

first and second pawls slideably received in the second compartment, with each of the first and second pawls including an inner face facing the plurality of teeth of the drive member, with the inner face of each of the first and second pawls including a plurality of teeth releasably engaged with the plurality of teeth of the drive member, with an elastic element being mounted between the first and second pawls to bias the first and second pawls away from each other to engage the plurality of teeth of the first and second pawls with the plurality of teeth of the drive member, with each of the first and second pawls further including a top face transverse to the inner face, with the first pawl further including a first coupling portion on the top face thereof, with the second pawl further including a second coupling portion on the top face thereof; and a control member including first and second ends and first and second faces extending between the first and second ends, with the first end of the control member being pivotably mounted to the first end of the drive member, with the second end of the control member covering the second compartment, with the control member further including a control section on the second face thereof, with the control member being pivotable between first, second, and third operative positions, with the second operative position intermediate the first and third operative positions, wherein when the control member is in the first operative position, the plurality of teeth of the second pawl are engaged with the plurality of teeth of the drive member, the control section of the control member is engaged with the first coupling portion of the first pawl to disengage the plurality of teeth of the first pawl from the plurality of teeth of the drive member, allowing the handle and the drive member to rotate in a first direction driving a fastener in the first direction, and allowing the handle to rotate freely relative to the drive member in a second direction reverse to the first direction without driving the fastener, wherein when the control member is in the third operative position, the plurality of teeth of the first pawl are engaged with the plurality of teeth of the drive member, the control section of the control member is engaged with the second coupling portion of the second pawl to disengage the plurality of teeth of the second pawl from the plurality of teeth of the drive member, allowing the handle and the drive member to rotate in the second direction driving the fastener in the second direction, and allowing the handle to rotate freely relative to the drive member in the first direction without driving the fastener, and wherein when the control member is in the second operative position, the plurality of teeth of each of the first and second pawls are engaged with the plurality of teeth of the drive member, allowing the handle and the drive member to rotate in either of the first and second directions driving the fastener, and not allowing free rotation of the handle relative to the drive member in either of the first and second directions without driving the fastener.

2. The ratchet wrench as claimed in claim 1, with the control section of the control member including a groove in the second face, with the groove having first and second lateral walls, with the first lateral wall engaging with the first coupling portion of the first pawl to disengage the plurality of teeth of the first pawl from the plurality of teeth of the drive member when the control member is in the first operative position, with the second lateral wall engaging with the second coupling portion of the second pawl to disengage the plurality of teeth of the second pawl from the plurality of teeth of the drive member when the control member is in the third operative position.

3. The ratchet wrench as claimed in claim 2, with the groove including decreasing widths toward the first end of the control member.

4. The ratchet wrench as claimed in claim 2, with the first side of the driving portion including a hole, with the second face of the control member further including an engaging groove, with the ratchet wrench further comprising, in combination:

a retaining member including a first end fixed in the hole and a second end received in engaging groove; and a positioning member fixed in the engaging groove, with the positioning member including first, second, and third positioning grooves corresponding to the first, second, and third operative positions of the control member, with the second end of the retaining member selectively engaged in one of the first, second, and third positioning grooves to retain the control member in one of the first, second, and third operative positions.

5. The ratchet wrench as claimed in claim 4, with the positioning member including a strip having the first, second, and third positioning grooves formed in a side of the strip.

6. The ratchet wrench as claimed in claim 5, with the engaging groove including first and second sidewalls each having a notch, with the strip having two ends engaged in the notches, and with the first, second, and third positioning grooves formed between the two ends of the strip.

7. The ratchet wrench as claimed in claim 6, with the first coupling portion including a first peg formed on an inner end of the top face of the first pawl, with the second coupling portion including a second peg formed on an inner end of the top face of the second pawl, with each of the first and second pawls including an end face transverse to the top face and to the inner face, with the end faces facing each other and each having a receptacle, and with the elastic element including a spring having two ends received in the receptacles.

8. The ratchet wrench as claimed in claim 4, with the first compartment including a peripheral wall having an annular recess, with the annular recess formed in the second side, with the drive member including a second end having a flange rotatably received in the annular recess, with the plurality of teeth formed between the first and second ends of the drive member.

9. The ratchet wrench as claimed in claim 8, with the first end of the drive member including a first annular groove, with the first end of the control member including a hole extending from the first face through the second face, with the hole including a peripheral wall with a second annular groove, and with a retainer ring received in the first and second annular grooves.

* * * * *